United States Patent [19]

Mo

[11] Patent Number: 4,757,402
[45] Date of Patent: Jul. 12, 1988

[54] SLIDER ASSEMBLY FOR SUPPORTING A MAGNETIC HEAD

[75] Inventor: Frank S. C. Mo, Cupertino, Calif.

[73] Assignee: Censtor Corp., Santa Clara County, Calif.

[21] Appl. No.: 914,996

[22] Filed: Oct. 3, 1986

[51] Int. Cl.⁴ ............................................. G11B 5/60
[52] U.S. Cl. .................................................... 360/103
[58] Field of Search ............................. 360/103, 102

[56] References Cited

U.S. PATENT DOCUMENTS 4,163,267  7/1979  DeMoss .................... 360/103 X

FOREIGN PATENT DOCUMENTS 50133533  5/1977  Japan .................................. 360/103
53-29111  3/1978  Japan .................................. 360/103

Primary Examiner—A. J. Heinz
Attorney, Agent, or Firm—Gerald L. Moore

[57] ABSTRACT

A magnetic head assembly including a slider (15) for supporting a magnetic transducer (12) adjacent the surface of a recording media (14) on an air film, said slider including an air bearing member (26) having a peripheral wall (38) extending toward said media and presenting a substantially equal cross sectional area to the air film moving with the media as the head is skewed slightly relative to the oncoming air film.

3 Claims, 3 Drawing Sheets

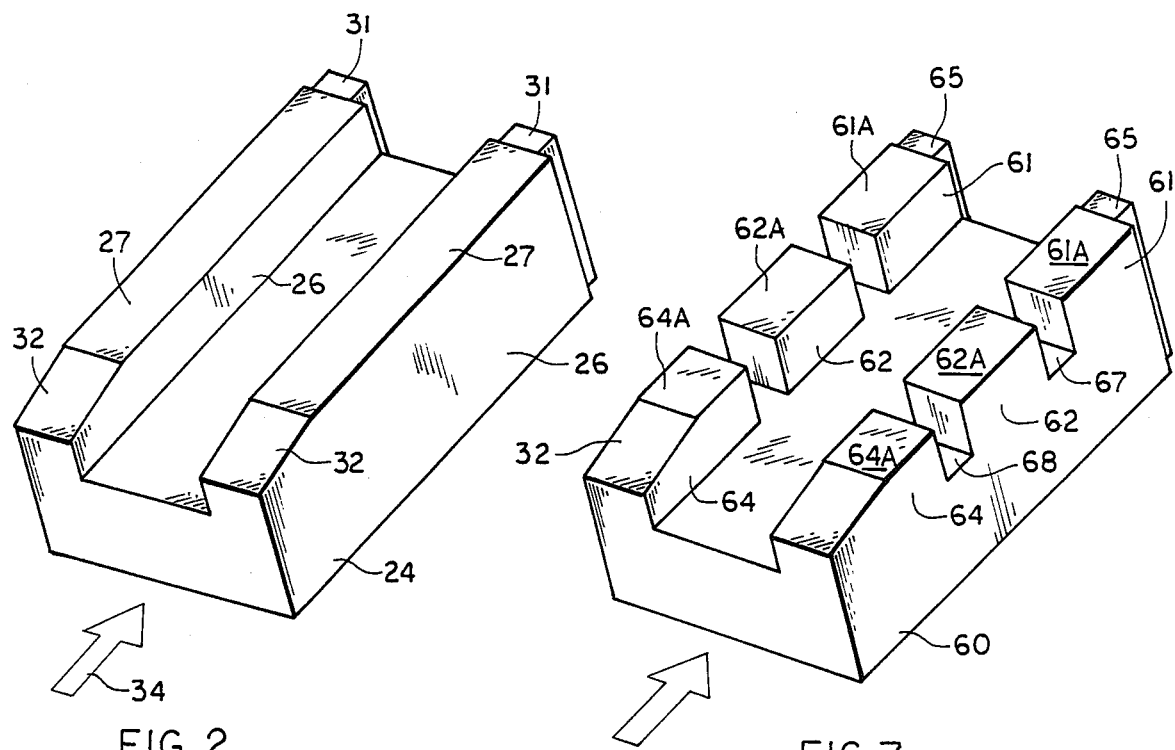
FIG. 2
PRIOR ART
FIG. 7
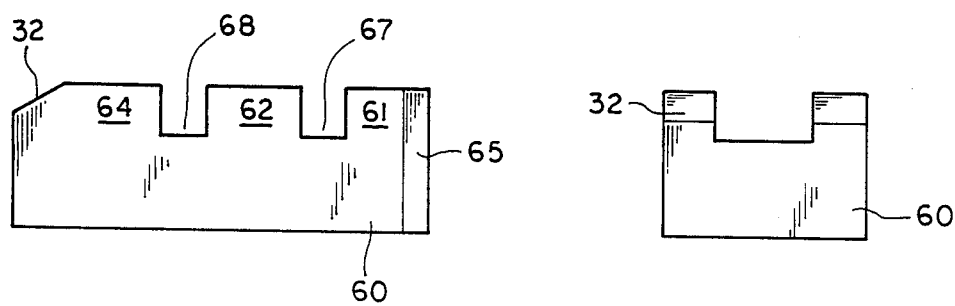
FIG. 8
FIG. 9

SLIDER ASSEMBLY FOR SUPPORTING A MAGNETIC HEAD

BACKGROUND OF THE INVENTION

1. Field of the Invention

This invention relates to a slider assembly that exhibits improved flying characteristics especially when the head is skewed as frequently occurs with rotary actuators.

2. Description of the Prior Art

With state of the art data recording wherein a magnetic head is flown over a disk on an air bearing assembly, the trend is to position the head closer to the magnetic surface. Additionally, when the disk is stopped sometimes the slider is allowed to come to rest directly on the magnetic surface. Frequently such systems utilize a rotary actuator for supporting the head; that is, the head is supported on an arm which is pivoted about a point such that the head is moved on an arc that approximates movement on a radius of the recording disk.

The slider assembly is supported on the air film that moved with the magnetic disk and forms an air bearing by the interaction of this film of air and the underside of the slider. As the slider is moved closer and closer to the disk, the possibility of contact is increased. Additionally, with the at-rest contact between the slider and the magnetic surface it is highly desired that the head raise to the flying height out of contact with the disk as soon as possible on start up and that the head remains flying as long as possible above the disk surface on shutdown.

With the use of a rotary actuator the slider is not always directly aligned with the directional flow of the air film. The air film does not flow directly circumferentially with the disk but instead always flows slightly outward due primarily to centrifugal forces. With the slider being moved along an arc it is not always positioned exactly perpendicular to the disk radius. These factors tend to introduce the problems of skewing which occur when the slider is not directly aligned with the direction of air flow. With skewing of the head it is common for the lift forces to diminish thereby lowering the flying height and increasing the possibilities of contact with the disk surface. As pointed out before, state of the art recording has required that the slider fly closer to the disk thereby lessening the margin for error. Additionally, with the recording of data at higher and higher densities, an unplanned contact with the magnetic film can result in catastrophic losses if damage to the magnetic film occurs. Thus, the lower flying height has greatly diminished the margin for variances in the flying height of the magnetic head in present day and future magnetic recording systems.

It is the purpose of the present invention to provide an improved slider assembly which provides for a quicker take off of the head from the disk surface, maintains the slider assembly at a more stable attitude for a better regulation of the head flying height, and greatly lessens the effect of skewing on the flying height.

SUMMARY OF THE INVENTION

A magnetic head assembly including a slider for supporting a magnetic transducer adjacent to a recording media on an air film, wherein the head assembly includes a body member for supporting the magnetic transducer, and an air bearing means comprising an air bearing member having a peripheral wall terminating at an air bearing surface positioned adjacent the media to form a lifting force for supporting the slider and magnetic transducer above the magnetic surface. The air bearing member is formed with a peripheral wall configured such that the member presents a substantially equal cross sectional area to the oncoming air film even though the slider is skewed slightly relative to the oncoming air thereby to maintain a substantially unchanged lifting force allowing the head to fly at a steady height.

DESCRIPTION OF THE DRAWINGS

FIG. 2 shows a prior art slider and transducer assembly;

FIG. 3 shows a first embodiment of the invention;

FIGS. 4 through 6 show other embodiments of the invention;

FIGS. 7, 8, and 9 are various views of yet another embodiment of the invention;

DESCRIPTION OF THE INVENTION

Figure 1:
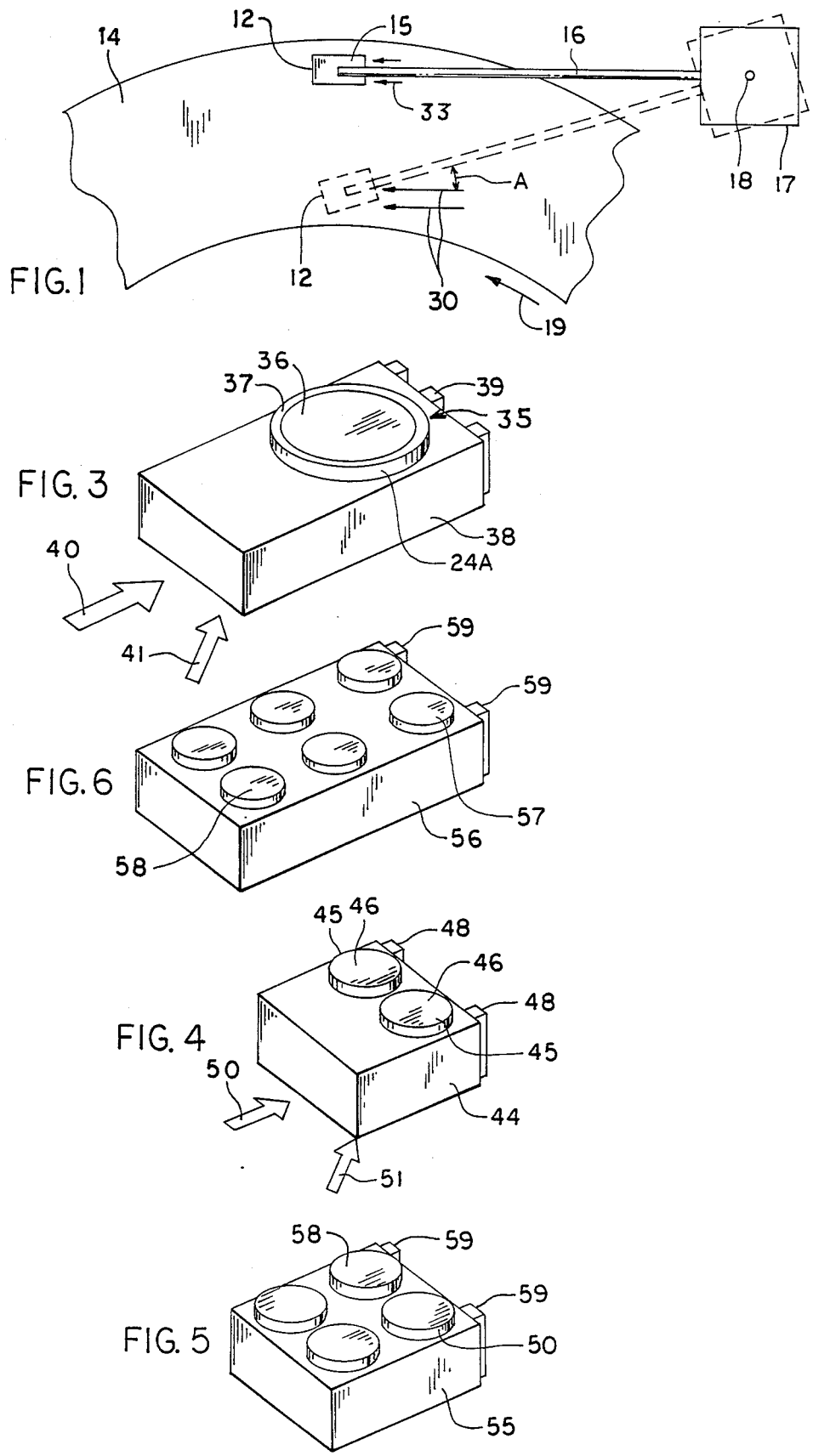
FIG. 1 is a top plan view showing a rotary actuator and magnetic head assembly positioned over a portion of a magnetic recording disk.

In FIG. 1 shown a typical magnetic recording system including a magnetic read/write head assembly 12 positioned above a rotating disk 14 by an air bearing created by a slider assembly 15 positioned by an arm 16 fixed to an actuator 17 which pivots around a pivot point 18. The disk is rotated in the direction of the arrow 19 and generally comprises a rigid or semi-rigid substrate (not shown) covered by a magnetic material in which information can be recorded in digital form by the alignment of magnetic particles in selected areas.

A typical prior art slider and head assembly is shown in FIG. 2 comprising a slider body having air bearing members 26 extending from one side. These members are spaced apart and form air bearing surfaces 27. Thus, when the recording media 14 is rotated, a film of air represented by the arrows 30 rotates therewith and interacts with the air bearing surface to cause the head to be spaced at a predetermined flying height above the surface for supporting the read/write heads 31 a fixed distance from the magnetic film. Forward inclined areas 32 assist in compressing the air film for better support of the slider. Thus the slider functions in a very efficient manner when the air film is approaching from headon, i.e., the direction indicated from the arrow 34.

However, as indicated in FIG. 1, the head assembly is positioned by an arm 16 that is fixed to an actuator 17 for rotation about a pivot 18. Thus, when the slider is in the solid line position, the air film indicated by the arrows 35 is approaching the slider head-on, i.e., at a zero skew angle. However, when the slider is moved near the inside of the recording member, i.e., in the dotted line position, the air film, traveling in the direction of the arrows 30, strikes the slider at an angle A to the optimum direction. This action reduces the lifting force of the air bearing and allows the head to settle somewhat closer to the media surface. In the past such action has not been critical since the head assembly was spaced further from the surface, however, with the advent of the state of the art systems, the heads fly much closer to the media, and any change can become critical.

In accordance with the present invention a slider and air bearing member is provided that will have less change in flying height as the approach or skew angle with the air film changes as described previously. The overall concept of the air bearing member of this embodiment is to present a cross sectional area to the oncoming air film that changes less as the approach angle of the air film is changed, thereby providing substantially the same lift to allow the slider to fly at approximately an equal distance above the recording media.

A first embodiment of the invention is shown in FIG. 3 in which the slider body 24A is illustrated. This slider body includes an air bearing member 35 formed in a cylindrical configuration to form a circular air bearing surface 36 tapered slightly at the edge 37. The air bearing member is formed with another peripheral wall 38. The slider has attached thereto a magnetic transducer 39. Thus it can be seen that with the air approaching in the direction of the arrow 40 at a zero skew angle, an air bearing effect is realized at the surface 36. Air approaching from this direction is exposed to the side of a cylinder formed by the air bearing member. Similarly, air approaching at a skew angle illustrated by the arrow 41 also is exposed to the sidewall of a cylinder formed by the air bearing member. Thus the effect is the same as far as the lift forces are concerned because the air bearing member appears the same to the oncoming air film approaching from either direction. As a result there is little or no change in flying height due to skewing of the head assembly except due to minor order cosine effects due to the pitch angle of the slider.

In FIG. 4 is yet another embodiment of the invention comprising a slider member 44 having formed on one surface a pair of air bearing members 45 forming air bearing surfaces 46. In this instance a pair of transducers 48 are fixed to the trailing edge of the head assembly. Once again the oncoming film of air represented by the arrow 50 will be encountered by a pair of circular air bearing surfaces formed on the cylindrical air bearing members 45. Similarly skewing of the head which will cause the air to approach, for instance from the direction of the arrow 51, will also expose the air film to a pair of circular air bearing surfaces thus changing the lift exerted on the head assembly little if at all.

FIGS. 5 and 6 also illustrate further embodiments of the invention wherein slider assemblies 55 and 56, respectively, have positioned thereon a plurality of air bearing members 57 all of cylindrical configuration and forming air bearing surfaces 58 of substantially equal area. Additionally transducers 59 are fixed to the trailing edge of the slider member. In each of these embodiments a change in the skew angle of the head assembly will change the exposure of the air film to the air bearing surface very little due partly to the cylindrical configuration of the air bearing members and also to the fact that the air bearing members are separated by spaces therebetween. Separation by these spaces allows the air film to flow between the air bearing members and fuly load the air bearing surfaces so as to create the necessary lift forces. Additionally a change in the angle the film approaches each member still exposes the air film to a air bearing member of similar cross section so as not to change the lift forces generated by the air bearing member.

Illustrated in FIGS. 7, 8, and 9 are still another embodiment of the invention wherein a slider member 60 includes two rows of air bearing members 61, 62, and 64. These air bearing members form respectively, the air bearing surfaces 61A, 62A, and 64A. Transducers 65 are fixed to the trailing edge of the slider. In this instance, the air bearing members 61 and 62 are separated by a laterally extending slot 67 while the forward bearing members 62 and 64 are separated by the transverse slot 68. It is recognized that not all of the air bearing surfaces create equal lift in such a structure and in this embodiment the surfaces 61A and 64A are thought to create greater life forces. It is important that at least those air bearing members creating the significant lift forces incorporate the subject invention of presenting a substantially equal cross-section even though the slider member might become skewed. Thus at least the members 61 and 64 should incorporate the present invention. For this reason they are somewhat square in cross-section.

Figure 10:
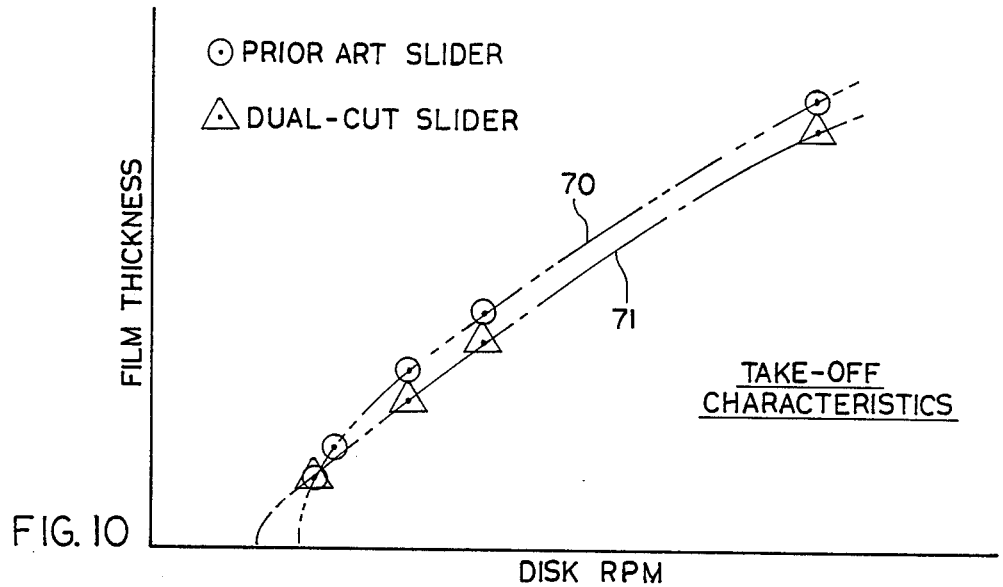
FIG. 10 shows the take-off characteristics for a magnetic head assembly employing the subject invention.

Turning now to FIG. 10 showing characteristics of the sliders 24 and 60 shown in FIGS. 2 and 7 respectively, it can be seen that the take off characteristics of the assembly 24 illustrated by the dotted line 70 are delayed considerably relatively to the take off characteristics of the assembly 60 as illustrated by the solid line 71. This illustrates that with the cross slot separating the air bearing members into distinct sections the head will lift from the rotating media much sooner than with prior head assemblies represented by the structure of FIG. 2. This results in less contact between the head and disk with the attendant reduction in wear to the disk surfaces and less accumulation of particles from the magnetic coating on the head assembly.

Figure 11:
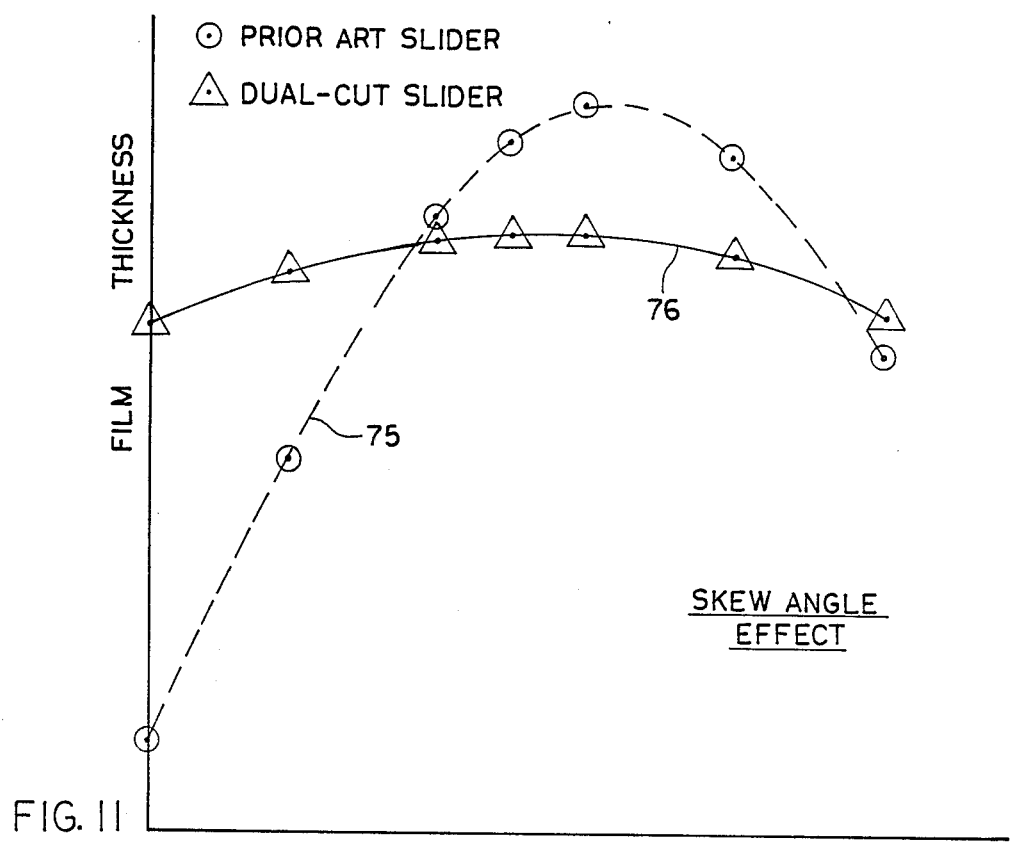
FIG. 11 shows the effect of changes in the skew angle of the magnetic head assembly on the flying height.

FIG. 11 illustrates the effect of a change in the skew angle on the flying height of the head. For the prior art head illustrated in FIG. 2 changes in the flying height are illustrated by the dash line 75 showing that the flying height changes considerably as the skew angle increases. For the same changes in the skew angle on the segmented air bearing member shown in FIG. 4 the solid line 76 illustrates that the flying height does not vary more than approximately 10% over the same skew angle change. Thus the segmenting of the air bearing members results both in a quicker take off of the magnetic head from the magnetic surface and less change in flying height as the skew angle changes. Changes in the skew angle can result from the actuation of the rotary actuator as described before.

It is thought that the fact that the cross sectional area of the individual air bearing members changes only slightly as the skew angle changes allow the lift forces to remain essentially the same so as to maintain the head assembly at very near a constant flying height. Even though in the embodiment shown in FIGS. 7 through 9, the cross sectional configuration of the air bearing members is changed from a circle to a square or a rectangle still with the change in the skew angle the cross sectional area presented to the air film remains substantially the same in contrast to the changes in the air bearing member cross section facing the air film in the prior embodiment shown in FIG. 2. As a result only a slight change in flying height is realized by use of the invention while much greater flying height changes are realized with the prior device shown in FIG. 2.

I claim:

1. A magnetic head slider for supporting a magnetic transducer adjacent the surface of a recording media on an air film flowing in the general direction of relative motion between the magnetic head and the media, said slider comprising:
a body member having a front and sides,
means to support the magnetic head on said body member,
air bearing means for maintaining said body member a predetermined flying height from said media surface with relative motion between said slider and media, comprising:
a plurality of air bearing members fixed to said body member and having a configuration including a peripheral wall extending toward the media and terminating at an air bearing surface formed with a first portion extending generally parallel to said media surface to create an air bearing for supporting the slider in spaced relationship from said media surface, and
said air bearing member peripheral walls being shaped to present a substantially equal cross sectional area to oncoming air film approaching from directly in front of said slider or from the front and side direction thereto to limit any change in lift due to skewing of the slider relative to the air film flow direction.

2. A magnetic head slider for supporting a magnetic transducer adjacent the surface of a recording media on an air film flowing in the general direction of relative motion between the magnetic head and the media, spaced from the surface of said slider comprising:
a body member,
means to support the magnetic head on said body member, and
an air bearing means for creating a lift effect and maintaining said body member at a predetermined flying height relative to said media surface with relative motion between the media and body member and as the body member is skewed relative to recording media, comprising:
a plurality of air bearing members each having a configuration including peripheral wall members extending from the body member towards the media and terminating at an air bearing surface formed with a first portion extending parallel to the media surface to create an air bearing for supporting the slider in spaced relationship relative to the media surface,
at least some of said air bearing members being positioned to create a substantial lifting effect to maintain the slider at a predetermined distance from and at a predetermined attitude relative to the media surface, and
those air bearing members positioned to create a substantial lift effect being formed to present no change of the cross sectional area of the bearing members to the air film as the slider is skewed relative thereto.

3. A magnetic head slider as defined in claim 2 wherein said air bearing members are all cylindrical in configuration.

* * * * *